(No Model.)
R. S. WILLIAMS.
DEVICE FOR AGITATING LIQUIDS.
No. 401,724. Patented Apr. 16, 1889.
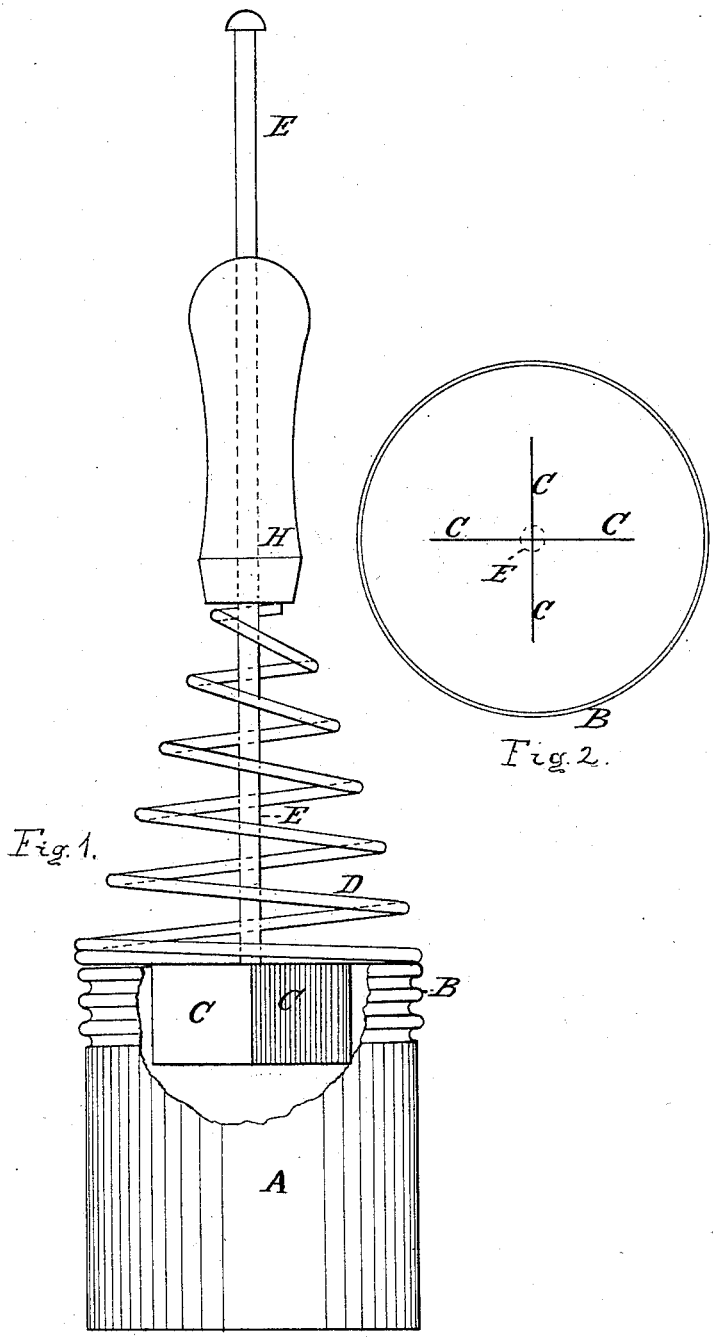
Witnesses:
Thomas J. Bewley.
Clifford E. Lampleue
Inventor,
Robert S. Williams

UNITED STATES PATENT OFFICE.

ROBERT S. WILLIAMS, OF MERCHANTVILLE, NEW JERSEY.

DEVICE FOR AGITATING LIQUIDS.

SPECIFICATION forming part of Letters Patent No. 401,724, dated April 16, 1889.

Application filed January 15, 1889. Serial No. 296,432. (No model.)

*To all whom it may concern:*

Be it known that I, ROBERT S. WILLIAMS, a citizen of the United States, residing at Merchantville, in the county of Camden and State of New Jersey, have invented certain new and useful Improvements in Devices for Agitating Liquids; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in milk-shakers, in which a vertical reciprocating motion is given to the reservoir containing milk and sirup to be agitated by means of the action of a helical spring placed intermediate between the surface of the detachable cap of the reservoir and the handle, said handle having vertical reciprocating motion upon a vertical rod or stem that projects from and is rigid upon the cap of the reservoir. A series of blades project downward from the under side of the cap of the reservoir into the main portion containing the milk, for more complete agitation of contents.

In the accompanying drawings, Figure 1 is a view of the device in elevation partly broken away. Fig. 2 is a view of the inner face of the cap B, showing blades C.

A is the reservoir for containing milk and sirup to be shaken.

B is the cap having screw-thread connection with the upper end of reservoir A.

E is the vertical rod, the lower end of which is connected to the upper surface of the cap B.

D is a helical spring surrounding the rod E, the lower end of which is rigidly attached upon the surface of cap B, the upper end having a similar attachment with handle H. The handle is provided with a bore, so that it may have free vertical reciprocating motion upon the rod E.

C are blades or breakers of sheet metal, the upper edges of which are secured upon the inner surface of the cap B and project downward into the reservoir A.

The operation of my device is as follows: The reservoir A is partly filled with milk and sirup. Then the cover B and its attachments are secured to the reservoir A in the manner stated. By grasping the handle H the device is given an up-and-down motion, and the contents of the reservoir are thereby thoroughly mixed and brought to a foam. The blade C C acts as a dasher to cause the contents of the reservoir to become more foamed.

I claim as my invention—

The liquid-agitating device described, consisting of a receptacle, A, having a tightly-fitting cap or cover, said cap or cover carrying upon its upper surface a spring, D, and a standard, E, and on its lower surface blades or breakers, in combination with a handle, H, secured to the upper end of the spring and provided with a bore for reciprocating upon said standard, substantially as shown and described.

ROBERT S. WILLIAMS.

Witnesses:
THOMAS J. BEWLEY,
CLIFFORD E. LARZELERE.